(12) United States Patent  
Matsuura

(10) Patent No.: US 6,454,039 B1
(45) Date of Patent: Sep. 24, 2002

(54) ATV TRANSMISSION CONTROL LAYOUT

(75) Inventor: Tatsuya Matsuura, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/561,403

(22) Filed: Apr. 27, 2000

(30) Foreign Application Priority Data

Apr. 27, 1999 (JP) .......................................... 11-120676

(51) Int. Cl.[7] .............................................. B60K 23/00
(52) U.S. Cl. ........................ 180/336; 180/311; 180/312
(58) Field of Search ............................... 180/312, 311, 180/219, 336; 280/848, 849, 853

(56) References Cited

U.S. PATENT DOCUMENTS

| 4,620,453 | A | | 11/1986 | Kumazawa | |
|---|---|---|---|---|---|
| 4,735,105 | A | | 4/1988 | Kumazawa | |
| 4,736,809 | A | | 4/1988 | Kumazawa | |
| 4,757,872 | A | * | 7/1988 | Inomata | 180/291 |
| 5,699,872 | A | * | 12/1997 | Miyakawa et al. | 180/291 |
| 5,791,431 | A | * | 8/1998 | Asao et al. | 180/311 |
| 6,186,263 | B1 | * | 2/2001 | Takano | 180/336 |

FOREIGN PATENT DOCUMENTS

| JP | 401190591 A | * | 7/1989 | 180/311 |
|---|---|---|---|---|
| JP | 404283186 A | * | 10/1992 | 180/219 |

OTHER PUBLICATIONS

Dirtwheels Magazine, Apr. 2000, 2000 Yamaha Grizzly 4X4 730cc, pp. 60–69.
Dirtwheels Magazine, Feb. 2000, 2000 Polaris Scrambler 500 4x5, pp. 60–65.
Dirtwheels Magazine, Mar. 2000, 2000 Polaris Scrambler 400, pp. 52–58.
Dirtwheels Magazine, Oct. 1999, 2000 Suzuki 500 4WD Quadmaster, pp. 64–74.
Dirtwheels Magazine, Oct. 1999, 2000 Grizzly 600 4x4, pp. 104–114.
Dirtwheels Magazine, Sep. 2001, 2002 Artic Cat 375 Auto 4WD & 2WD, pp. 80–86.
Parts Catalogue, Model Year 2000, Grizzly, YFM600FWAM (5GT60 (U49)—YFM600FWAMC (5GT62) (Calif).
Parts Catalogue, Model Year 1999, Grizzly,YFM600FWAL (5GT1) (U49)—YFM600FWALC (%GT2) (California).
Parts Catalogue, Model Year 1999, Kodiak, YFM400FWL (5EH1) (U49)—YFM400FWLC (5EH2) (California).
Parts Catalogue, Model Year 2000, Kodiak 4WD Realtree X–TRA, YFM400FAHM (5GH6) U49—YFM400FAHMC (5GH7) Calif.
Parts Catalogue, Model Year 2001, Kodiak 4WD, YFM400FAN (5GH9), YFM400FAHN (5GHF) Hunter Ed.
Polaris Sales, Inc., Parts manual 2000, Scrambler 500, Model #A00BG50AA, Rev. 01.
ATV Connection Magazine, Polaris Scrambler 500, Totally Goose Happy Quad, Dec. 14, 1999, Bob Davis—8 pages.

* cited by examiner

*Primary Examiner*—Eric Culbreth
*Assistant Examiner*—Deanna Draper
(74) *Attorney, Agent, or Firm*—Knobbe, Martens, Olson & Bear, LLP

(57) ABSTRACT

A gear shift arrangement for an all terrain vehicle is provided. The all terrain vehicle comprises a frame defining an engine compartment. The frame is supported by two or more front wheels and two or more rear wheels. An engine is mounted in the engine compartment and is drivingly coupled to one or more of the wheels through a suitable drive train. A fender assembly is disposed above the front wheels and has a recess formed therein. A gear shift actuator is at least partially disposed in the recess. The recess can be disposed inboard of an inner surface of the front wheels and rearward of the rearmost surface of the front wheels. The actuator is sized and positioned to lie generally below an upper plane defined through either a front fender assembly, a carrying rack mounted to the front assembly, or both.

36 Claims, 4 Drawing Sheets

ATV TRANSMISSION CONTROL LAYOUT

PRIORITY INFORMATION

This application is based on and claims priority from Japanese Patent Application No. 11-120676, filed Apr. 27, 1999, the entire contents of which is hereby expressly incorporated by reference.

BACKGROUND OF THE INVENTION

1. Field of the Invention

The present invention relates generally to component layouts for all terrain vehicles. More particularly, the present invention relates to transmission control layouts for all terrain vehicles.

2. Description of the Related Art

All terrain vehicles are typically powered by an internal combustion engine. The engine provides power to the front and/or rear wheels of the vehicle through a suitable drive train. The drive train generally transfers power from the engine to one or more wheels of the vehicle and can include a v-belt variable speed transmission coupled to a shiftable gear box. The shiftable gear box enables an operator of the vehicle to shift between a number of different transmission states, such as high, low, neutral, reverse, and park, typically while the vehicle is at rest. In some arrangements, the shiftable gear box allows shifting between gear ratios while the vehicle is moving, for instance.

Accordingly, all terrain vehicles typically include a gear shift actuator, such as a shift control lever or a push button control, that allows the operator of the vehicle to shift between the different transmission states. The control typically is located on a side of the vehicle between the front and rear fenders. For instance, the control can be mounted to a lateral side of the engine/transmission combination. One problem with such designs is that the control intrudes into the leg space of an operator of the vehicle. When the operator sits in typical straddle fashion with one leg on either side of a seat, the inner leg or knee of the operator often bumps the control. In addition to being uncomfortable, if the leg of the operator hits the control with sufficient force, the transmission can shift unexpectedly.

SUMMARY OF THE INVENTION

Accordingly, a gear shift arrangement for an all terrain vehicle is provided, wherein the gear shift control is at least partially disposed within a recess formed in a front fender assembly. The gear shift control preferably does not extend into the operating space of the vehicle. Thus, the leg of the operator is less likely to bump the gear shift control. The gear shift control, nevertheless, preferably is within easy reach of the operator from the seat of the vehicle.

One aspect of the present invention, therefore, involves an all terrain vehicle comprising a frame assembly. At least one front wheel and at least one rear wheel support the frame. An engine compartment is defined within the frame assembly generally between the front wheel and the rear wheel. An engine is mounted in the engine compartment and a drive train couples the engine to at least one of the front wheel or the rear wheel. A fender assembly is disposed generally above one of the front wheel or the rear wheel. The fender assembly has an opening formed therein and a gear shift actuator is at least partially disposed within the opening.

Another aspect of the present invention involves an all terrain vehicle comprising a frame defining an engine compartment. At least one front wheel and at least one rear wheel support the frame. An engine is mounted in the engine compartment and a drive train connects the engine to at least one of the front wheel or the rear wheel. A fender assembly is disposed above at least a rear portion of the front wheel and the fender assembly has a recess formed therein. A gear shift actuator is at least partially disposed in the recess.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which drawings.

DETAILED DESCRIPTION OF THE PREFERRED EMBODIMENT

Figure 1:
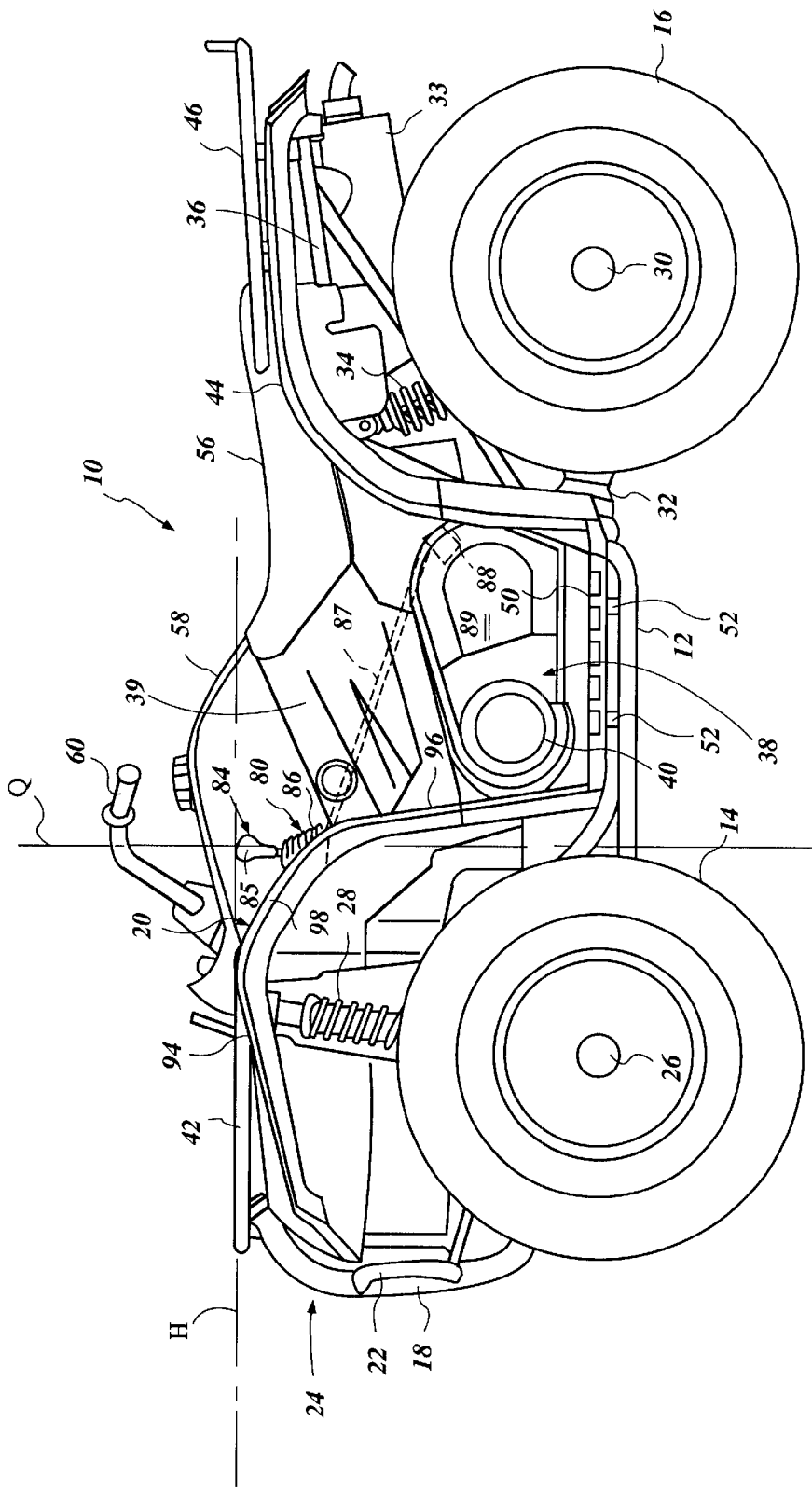
FIG. 1 is a left side elevation view of an all terrain vehicle arranged and configured in accordance with the present invention.

With reference now to FIG. 1, an all terrain vehicle is illustrated and generally indicated by the reference numeral 10. The illustrated vehicle 10 generally comprises a gear shift arrangement configured in accordance with certain features, aspects and advantages of the present invention, as will be described below. While the present invention will be described in the context of the illustrated vehicle 10, it should be understood that the present invention may also find utility in a number of other applications. For instance, the present invention can be used in a variety of other vehicles, such as snowmobiles, tractors, garden equipment and the like. Those of ordinary skill in the relevant arts will readily appreciate the broad array of applications in which the present invention can be used.

With continued reference to FIG. 1, the illustrated vehicle 10 generally comprises a frame assembly 12 that is dirigibly supported by a plurality of wheels. In the illustrated arrangement, the frame assembly 12 is carried by a pair of front wheels 14 and a pair of rear wheels 16. As will be recognized, the vehicle 10 could be carried by a single forward wheel and a pair of rear wheels, a pair of forward wheels and single rear wheel, or any number of front or rear wheels. Furthermore, as discussed above, the present invention can also be used with vehicles that utilize driving track arrangements and forward runners, for instance.

The frame assembly 12 is generally of the welded up type, such as that known to those of ordinary skill in the art. While not illustrated, the presently preferred type of frame comprises a left side assembly and right side assembly. The left side assembly and the right side assembly form generally parallelogram side structures that are interconnected with crossing members. Because these assemblies are well known to those of ordinary skill in the art, further description of the frame assembly 12 is deemed unnecessary to understand the present invention.

A forward portion of the illustrated frame assembly 12 comprises a front bumper 18. With reference now to FIGS.

1 and 3, the front bumper 18 preferably extends upwardly and forwardly of a lower portion of the illustrated frame assembly 12. In this manner, the front bumper 18 wraps over a forward portion of a front fender assembly 20, which will be described below. The front bumper 18 can be formed integrally with the frame assembly 12 or can be a separate add-on component, as will be recognized by those of ordinary skill in the art.

Figure 2:
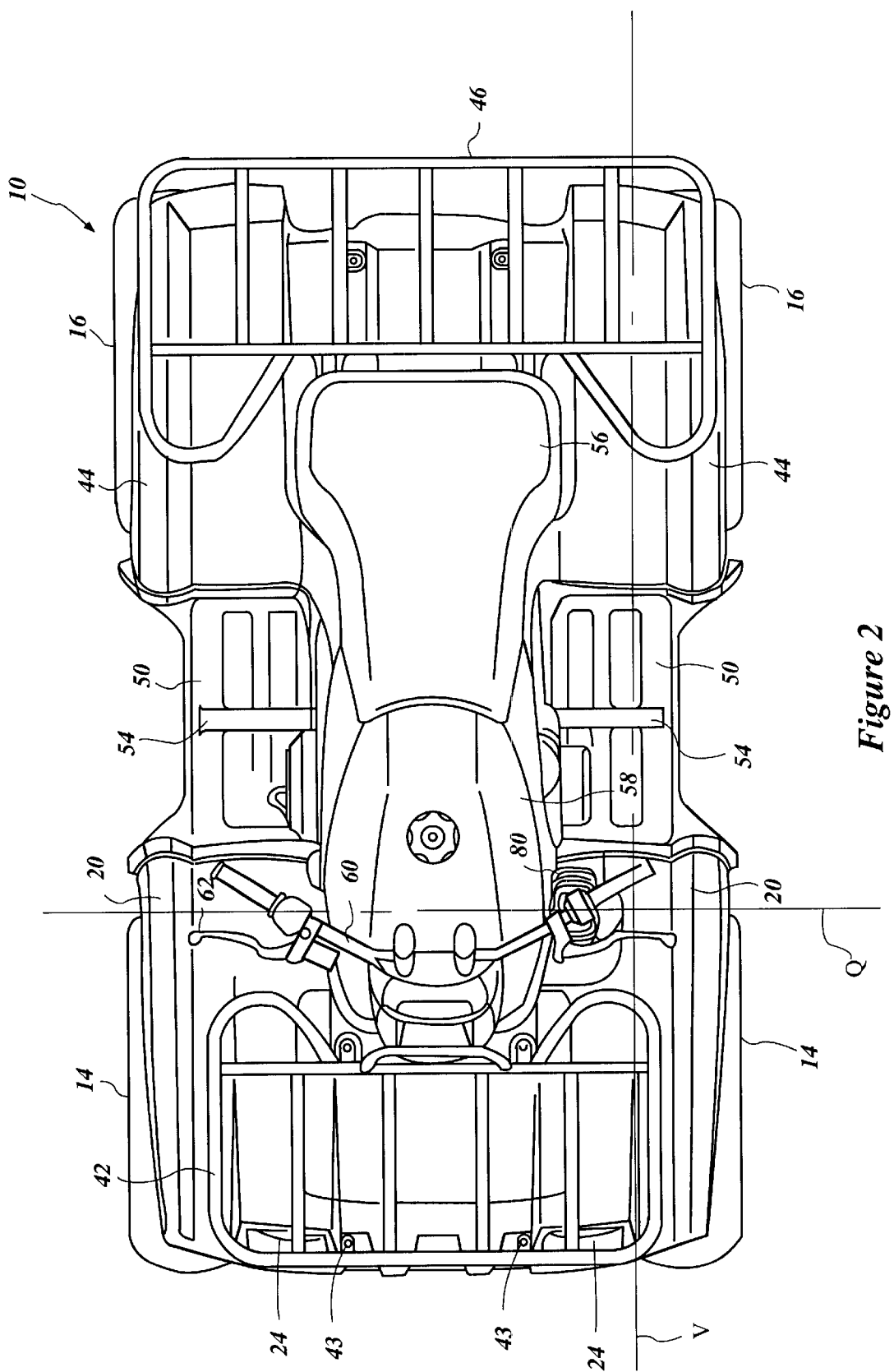
FIG. 2 is a top plan view of the all terrain vehicle of FIG. 1.
Figure 3:
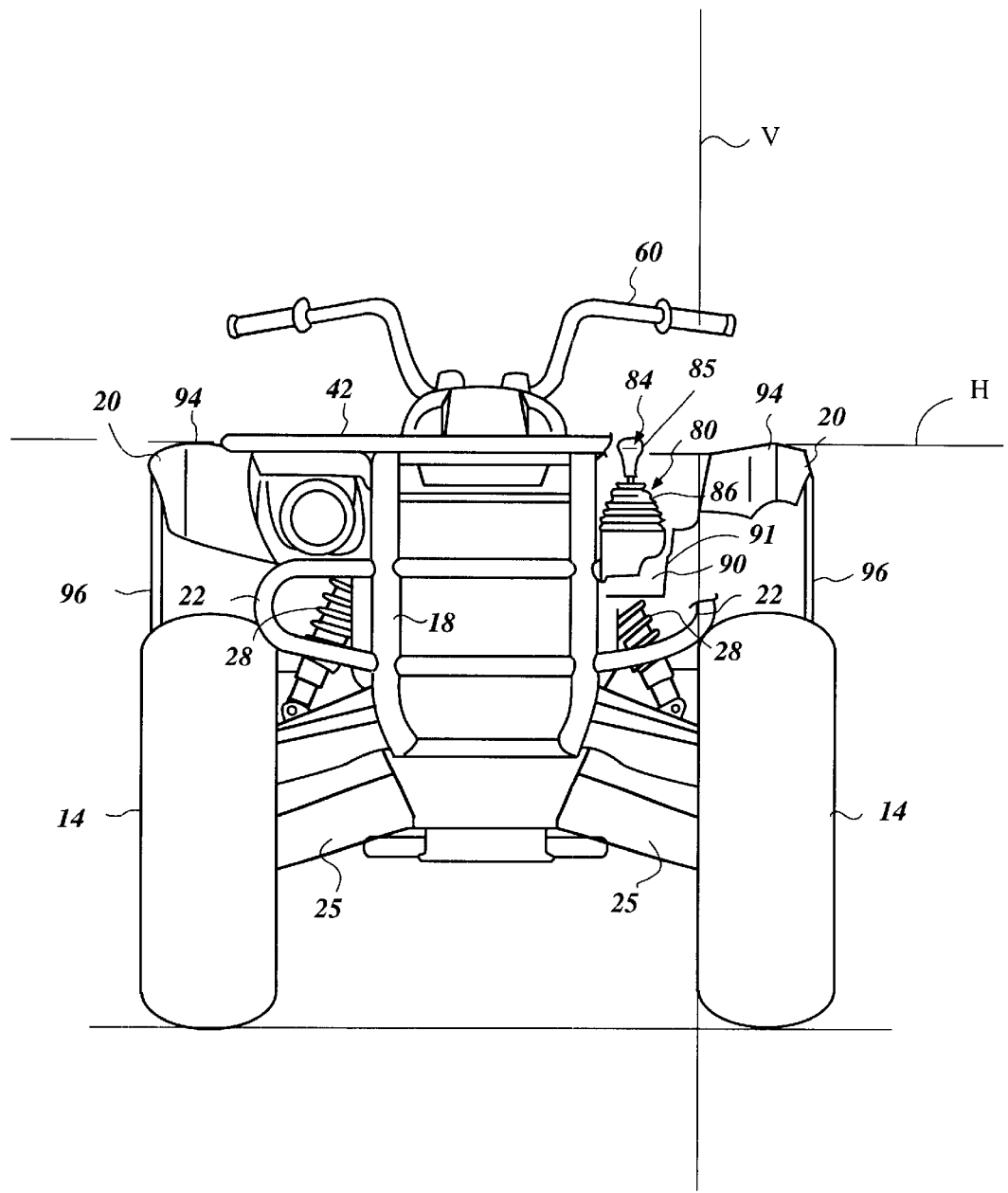
FIG. 3 is a partially sectioned front elevation view of the all terrain vehicle of FIG. 1, with a portion of the front of the vehicle removed to better illustrate a presently preferred location of a transmission control.

Additionally, the front bumper 18 preferably comprises a pair of headlight protectors 22 that extend laterally outward from the front bumper 18. The illustrated headlight protectors 22 protect a pair of forwardly directed headlights 24, which are best shown in FIGS. 2 and 3.

The illustrated front wheels 14 are rotatably supported by a front suspension system. The illustrated front suspension system generally comprises a pair of A arms 25. The A arms 25 preferably extend laterally outward from the frame assembly 12 and support a carrier hub, which is not shown. Each front wheel 14 is supported by a front axle 26 that is journaled by the carrier hub (not shown). In addition, a shock absorber or strut 28 extends between a portion of the frame assembly 12 and the carrier hub to control vertical movement of the axle 26 during operation of the vehicle 10. Each shock absorber 28 is mounted in a suitable manner at an upper portion to the frame assembly 12 and at a lower portion to either the A arm 25 or the carrier hub. Preferably, the shock absorber 28 is positioned rearward of the axles 26 and is slightly inclined rearward. Such a positioning and disposition results in a more compact construction for the overall vehicle and better accommodates various components within an engine compartment, as will be described. Because the suspension arrangement generally is well known to those of ordinary skill in the art, further description of the arrangement is deemed unnecessary.

With continued reference to FIG. 1, the rear wheel 16 preferably also rotates about an axle 30. In the illustrated arrangement, both of the rear wheels 16 are mounted to a common axle 30; however, independently suspended rear wheels 16 also can be used. The illustrated axle 30 is rotatably supported by a rear swing arm 32, which extends from a portion of the frame assembly 12. Movement of the rear arm 32, and therefore the axle 30, is controlled using a shock absorber 34. The swing arm 32 preferably is pivotally attached to the frame assembly 12 and rotates about a generally horizontal axis. The shock absorber 34 can be connected to the swing arm 32 or to a gear box that is attached to a portion of the swing arm 32 proximate the axle 30. In addition, an upper portion of the shock absorber 34 preferably is connected to a portion of the frame assembly 12, such as a seat rail 36. In this manner, movement of the rear wheels 16 about the pivot point defined by the swing arm 32 can be controlled. In addition, in the illustrated arrangement, a muffler 33 is connected to the frame assembly 12 directly rearward of the shock absorber 34.

The illustrated frame assembly 12 forms a platform upon which a variety of other components are mounted. For instance, the hollow center of the illustrated frame assembly 12 generally defines an engine compartment 38. The engine compartment 38 generally is defined between the left portion and the right portion of the frame assembly 12 and generally is disposed between the front axle 26 and the rear axle 30. This location provides a low center of gravity for the vehicle by mounting a centrally located engine 40 within the engine compartment 38. The engine 40 can be of any suitable construction and can be positioned either transversely or longitudinally within the engine compartment 38. In other words, a crankshaft (not shown) of the engine 40 can extend transverse to the direction of travel of the vehicle 10 or can extend along the same direction of travel of the vehicle.

In some applications, such as the illustrated arrangement, a side panel 39 can at least partially enclose the engine compartment 38. The side panel 39 preferably extends downward from a portion of a seat 56 and a fuel tank 58 toward an exterior surface of the engine 40 and an associated transmission 64.

As indicated above, a forward fender assembly 20 preferably is disposed above the forward wheels 14. The forward fender assembly 20 can be comprised of a single component or multiple components and preferably extends around the front portion of the vehicle 10. The front fender assembly 20 desirably is made from a moldable resin material or a lightweight sheet metal and preferably is mounted to the frame assembly in any suitable manner. The illustrated arrangement uses threaded fasteners to removably attach the front fender assembly 20 to the frame assembly 12.

In the illustrated arrangement, a carrier rack 42 is mounted above a portion of the front fender assembly 20. With reference to FIG. 2, the carrier rack 42 preferably is connected to the front fender assembly 20 using mechanical fasteners 43, such as threaded fasteners, for instance. More preferably, the carrier rack 42 is connected to the front fender assembly 20 using threaded fasteners 43, or other mechanical fasteners, that can be removed from the top of the vehicle. The use of top mounted fasteners advantageously allows easy removal of the carrier rack 42 for maintenance. For instance, when operating the vehicle on a trail, should the carrier rack need to be removed to access a component that is positioned under the carrier rack 42, it is preferred that an operator not have to crawl underneath the vehicle to remove the carrier rack. Of course, the carrier rack 42 can be connected to the front bumper 18 and can be pivotally connected to the front bumper 18 is other applications. By pivotally mounting the carrier rack 42, the carrier rack 42 can be pivoted out of the way for maintenance without completely removing the rack 42 from the vehicle 10.

With reference again to FIG. 2, a rear fender assembly 44 is disposed above the rear wheels 16 on the illustrated vehicle 10. Similar to the front fender assembly 20, the rear fender assembly 44 desirably extends above both rear wheels 16 and preferably is formed as one or more than one components. In the illustrated arrangement, the rear fender assembly 44 is formed of a single component and carries a rear carrying rack 46. The rear fender assembly 44 can be manufactured from a variety of materials including molded resin composites and lightweight sheet metals. Desirably, the rear fender assembly 44 and the front fender assembly 20 protect the operator of the vehicle from debris kicked up by the tires during movement of the vehicle 10.

With reference now to FIG. 2, a pair of footsteps 50 extend laterally from a central portion of the illustrated vehicle 10. The footsteps 50 can be mounted to the frame assembly 12 in any suitable manner. Typically, the footsteps 50 are mounted using brackets 52, which extend outward from the frame assembly 12. Preferably, the footsteps 50 extend between a portion of the rear fender assembly 44 and a portion of the forward assembly 20 to create an enclosed and protected rider leg area. In addition, the footsteps 50 preferably include traction increasing surfaces, such as raised ridges 54 to increase foot traction for the operator of the vehicle 10. In some arrangements, the footsteps 50 (also called foot boards) comprise plate-like members. In other arrangements, the footsteps 50 are nerf bars. In yet other applications, the footsteps are tubular components upon which a rider can be supported.

A seat 56 preferably is disposed above a portion of the rear fender assembly 44. The seat 56 generally is configured to allow an operator to sit in straddle fashion with one leg on each footstep 50. Of course, the seat 56 can be configured to accommodate more than one rider in a tandem straddle fashion. The illustrated seat 56 is mounted to the seat rails 36 in any suitable manner, but preferably is mounted to the seat rails 36 in a locking and pivoting arrangement. More particularly, the seat 56 preferably includes a portion which is pivotably attached to the seat rails 36 such that the seat 56 can be unlatched and raised to access the engine compartment 38. In some arrangements, the seat can freely pivot and is not latched; however, latching better secures the seat 56 to the frame assembly.

With continued reference to FIGS. 1 and 2, a fuel tank 58 preferably is disposed forward of the illustrated seat 56. The fuel tank 58 is mounted in any suitable manner and can be made from any suitable material. Preferably, the fuel tank 58 is made from molded resin materials; however, the fuel tank 58 also can be formed from a lightweight metal material. The fuel tank 58 preferably is mounted rearward of a steering handle assembly 60.

The steering handle assembly 60 is coupled to the front wheels 14 through a suitable steering arrangement, which is not shown. The steering handle arrangement 60 also generally comprises a throttle actuator of some sort. In one arrangement, the throttle actuator is a twist grip. In other arrangements, the throttle actuator may be a thumb paddle or handpull lever. Moreover, a brake control lever 62 can be mounted to the handlebar assembly 60 for operation of the brakes.

The vehicle 10 preferably also includes a gear shifting arrangement that is configured and arranged in accordance with certain features, aspects and advantages of the present invention. The engine 40 provides power to one or more wheels of the vehicle 10 through a suitable drive train. In the illustrated embodiment, the drive train includes a v-belt type variable speed transmission coupled to a gear box. Desirably, the gear box is of the type that is shiftable between a number of different transmission states, such as high, low, neutral, reverse, and park, as is well known in the art. For instance, the transmission can include a number of parallel shafts that are connected by differing gear ratios and reverse shafts. The at least one of the mating gears can spin freely on the associated shaft until coupled thereto using a sliding dog arrangement.

With reference again to FIG. 1, the present gear shift arrangement preferably includes a gear shift actuator 80. In the illustrated embodiment, the gear shift actuator 80 comprises a shift lever 84; however, other types of gear shift actuators can also be used, including, for example, push button gear shift actuators. The gear shift lever 84 can be positioned anywhere proximate the operator of the vehicle 10 such that the gear shift lever 84 can be easily actuated by the operator. For instance, the lever 84 can be disposed on a portion of the front fender assembly 20 or on a portion of the rear fender assembly 44. In one arrangement, the gear shift actuator 84 is mounted within a recess 90 formed within the forward fender assembly 20.

In the illustrated arrangement, a shift knob 85 also is attached to an upper end of the shift lever 84 to allow the operator to comfortably and securely grasp the shift lever 84. The knob 85 can include a lock button that is depressed to enable or restrict movement of the shift lever 84. In addition, a dust cover 86 preferably is provided over a central portion and a lower portion of the shift lever 84 to keep dust, dirt and other debris out of the shift actuator 80 and to provide a more pleasing appearance.

With reference now to FIG. 1, the lower end of the lever 84 can be pivotally connected to an end of a tie rod 87 that extends through a portion of the engine compartment 38. More preferably, the tie rod 87 extends through the engine compartment 38 between the fuel tank 58 and the engine 40. The tie rod 87 preferably extends between the shift lever 84 and a shift drum 88. The tie rod 87 advantageously transfers both tensile and compressive loads in the illustrated arrangement; however, in some applications, the tie rod 87 can be a wire that solely transfers tensile loads. The tie rod 87 can be pivotally connected to the shift drum 88 in any suitable manner. In the arrangements featuring a tensile-only tie rod 87, the shift drum 88 can be biased such that the shift drum 88 returns to a home position when the tensile force transferred through the tie rod 87 is removed.

As is known, the shift drum 88 typically is disposed within a gear box 89, which is associated with the transmission. Movement of the shift lever 84 by the operator of the vehicle 10 causes the tie rod 87 to translate longitudinally. The longitudinal movement of the tie rod 87, in turn, causes the shift drum 88 to rotate about an axis. As is known, the shift drum 88 typically includes a cam surface that drives shifting dogs within the transmission when the shift drum is rotated. The dogs selectively couple different gear sets to the shafts within the transmission.

Figure 4:
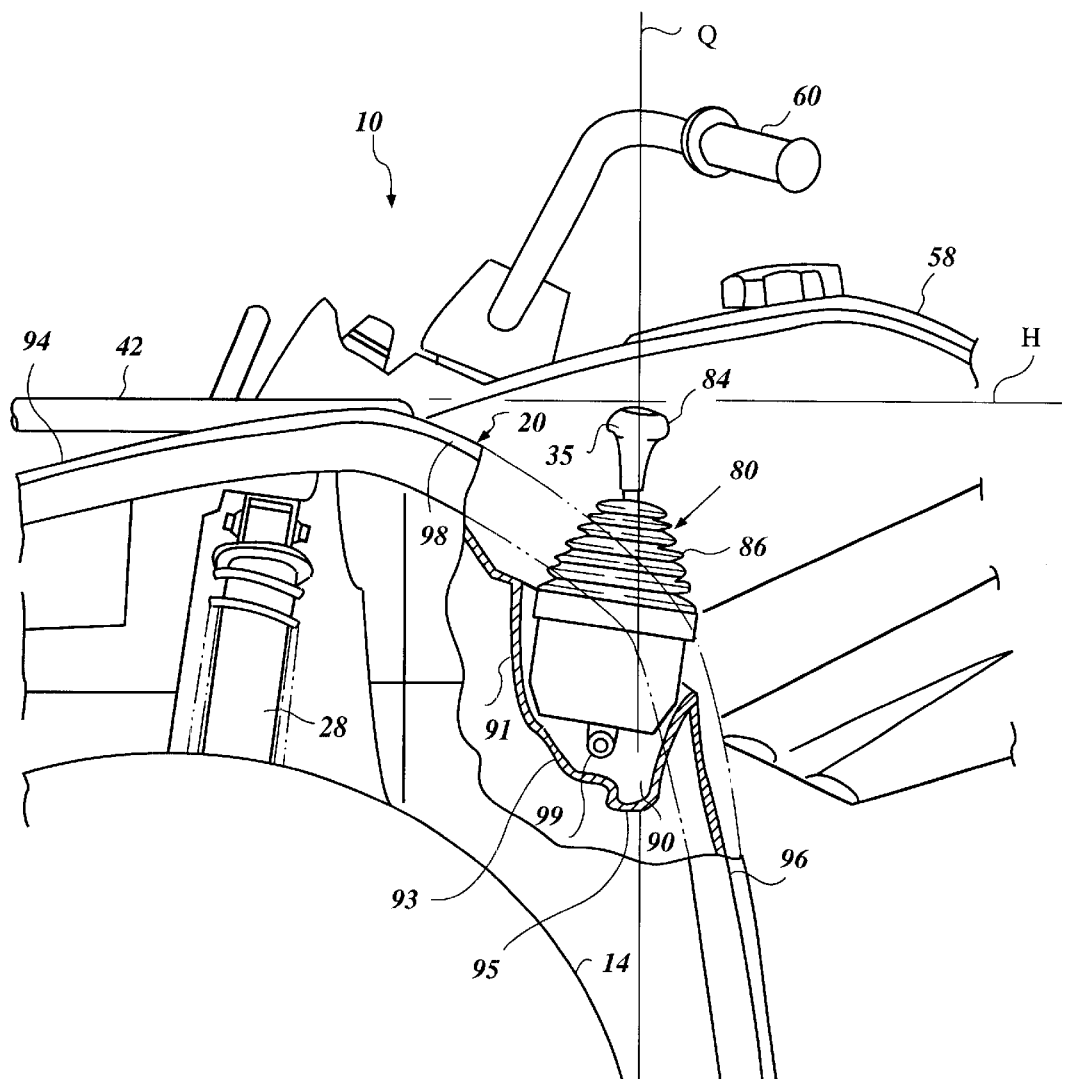
FIG. 4 is a partially sectioned left side elevation view of the all terrain vehicle of FIG. 1, with a portion of the front fender assembly removed to better illustrate a presently preferred location of a transmission control.

With reference to FIGS. 3 and 4, a recess 90 preferably is formed in a fender of the vehicle 10 to accommodate at least a portion of the shift actuator 80. The recess preferably is defined by a side wall 91 and a bottom wall 93. The side wall 91 can comprise one, or more than one, wall and, in the illustrated arrangement, is a single generally cylindrical wall. A drain 95 preferably extends through at least one of the side wall 91 and the bottom wall 93. In the illustrated arrangement, the drain 95 extends through the bottom wall 93 and preferably includes a labyrinth-type passage such that water or other liquids can drain from the recess 90 while liquids are substantially blocked from a direct path into the recess from below the recess 90. Preferably, the drain 95 is disposed within a trough formed in the bottom wall 93. Additionally, the recess 90 can be formed in a generally conical configuration to aid drainage and reduce manufacturing costs.

In the illustrated arrangement, the recess 90 is formed within the front fender assembly 20; however, it is anticipated that the recess can be formed within the rear fender assembly 44 as well. Mounting the shift actuator 80 within the front fender assembly 20 advantageously places the gear shift control 84 within easy reach of the operator of the vehicle 10 while the operator is seated on the seat 56.

The recess 90 preferably is molded or pressed into the front fender assembly 20 during fabrication of the fender assembly 20; however, the recess 90 also can comprise a separate cup-like component that fits into an opening formed in the front fender assembly 20. In some arrangements, the recess 90 can be replaced by an opening through the front fender assembly 20; however, a compartment or recess that is substantially sealed from an inner surface of the front fender assembly is preferred for protection of the actuator 80 from mud, dirt, dust and other debris commonly kicked up by the rotating wheels.

In the illustrated arrangement, the recess 90 is disposed within an inboard portion of the fender assembly 20. More particularly, the recess 90 is positioned inboard of a generally vertical longitudinal plane V that extends along an inner surface of the illustrated front wheel 14. Preferably, the recess is positioned inboard of a sweep of the wheel 14 that is defined when the wheel 14 is turned and the shock absorber 28 is compressed. More preferably, the recess 90 is positioned such that the wheel 14 does not contact the walls that define the recess when the wheel 14 is at any location within the turning range and when the shock absorber 28 is fully compressed or removed. Even more preferably, at least a portion of the recess 90 and the wall 91 is disposed rearward of a generally vertical transverse plane Q that extends along the rearmost surface of the front wheels 14 when they are positioned for straight ahead riding (see FIG. 4). It is anticipated that the construction of the recess 90, the wall 91 and the actuator 80 can be altered to accommodate the profile of the wheel such that clearance between these components and the wheel can be maintained even on smaller vehicles or on vehicles that have been modified. Each of the above-described arrangements result in a compact configuration that substantially protects the actuator from contact with the moving wheels.

With reference to FIGS. 1 and 4, the front fender assembly 20 preferably comprises a front section 94 that extends in a generally fore-aft direction and that is generally disposed above the front wheels 14 of the vehicle 10. In addition, the front fender assembly 20 preferably comprises a substantially vertical rear section 96, which extends upwardly from a forward side of the foot rests 50. A transition section 98 can be formed between the front section 94 and the rear section 96. The recess 90 preferably is formed in the rear section 96 or the transition section 98 of the front fender assembly 20 adjacent the fuel tank 58, as best illustrated in FIG. 4. Advantageously, positioning the recess 90 within the rear section 96 or within the transition section 98 (or both) positions the recess 90 within a zone of high clearance, such as that described above.

The gear shift actuator 80 can be mounted in any suitable manner. Preferably, the gear shift actuator 80 comprises a mounting lug 99 that receives a mechanical fastener (not shown). The illustrated actuator 80 is coupled to the frame assembly 12 by passing the fastener through the lug 99 and through a bracket that is welded or otherwise secured to the frame assembly or through a hole formed in the frame assembly 12 itself. When mounting the actuator 80, an upper extreme of the actuator 80 preferably does not extend substantially above a generally horizontal plane H defined along the top of the front cargo carrier 43 or front fender assembly 20. Such a positioning can be controlled by limiting the length of the lever 84, by changing the location of the recess 90 or by varying the depth of the recess 90, for instance. Advantageously, lowering the upper extreme of the shift actuator 80 below the plane H facilitates hauling loads that exceed the longitudinal length of the rack 43 and protects the actuator 80 for incidental contact during operation of the vehicle in wooded terrain, for instance. The protective aspect is further enhanced when the plane H is defined by an upper surface or portion of the rack 43, which preferably is manufactured from a rigid reinforcing metal material, because the rack can act as a guard or shield when positioned generally vertically higher than the actuator 80.

With reference now to FIG. 2, the illustrated gear shift actuator 80 advantageously is positioned outside of the operator leg area, which is generally defined by the foot boards 50 and between the two fender assemblies 20, 44. Thus, when the operator of the vehicle 10 sits in typical straddle fashion with a foot on the corresponding one of the foot rests 50, the leg or knee of the operator is less likely to contact the gear shift actuator 80 accidentally. Such incidental contact is made more likely if the height of the actuator 80 is lowered and the actuator continues to be positioned within the operator leg area instead of being at least substantially removed from the operator leg area.

Although the present invention has been described in terms of certain preferred embodiments, other embodiments apparent to those of ordinary skill in the art also are within the scope of this invention. Thus, various changes, modifications, and alterations may be made in the above-described embodiments without departing from the spirit and scope of the invention. Moreover, not all the features, aspects, and advantages are necessarily required to practice the present invention. Therefore, some of the features, aspects, and advantages may be separately practiced from other features, aspects, and advantages while still practicing a part or all of the above-described invention. Accordingly, the scope of the present invention is intended to be defined only by the claims that follow.

What is claimed is:

1. An all terrain vehicle comprising a frame assembly, at least one front wheel and at least one rear wheel supporting said frame, an engine compartment being defined within said frame assembly generally between said front wheel and said rear wheel, an engine being mounted in said engine compartment, a drive train coupling said engine to at least one of said front wheel or said rear wheel, a fender assembly being disposed generally above one of said front wheel or said rear wheel, said fender assembly having an opening formed therein, and a gear shift actuator being at least partially disposed within said opening.

2. The vehicle of claim 1, wherein said gear shift actuator comprises a shift lever.

3. The vehicle of claim 1, wherein at least one side wall circumscribes said opening and a bottom wall is connected to said side wall at a location generally below said opening.

4. The vehicle of claim 3, wherein a drain extends through at least one of said bottom wall and said side wall.

5. The vehicle of claim 4, wherein said drain extends through said bottom wall.

6. The vehicle of claim 3, wherein said side wall is manufactured from a resin-based material.

7. The vehicle of claim 1, wherein a generally vertical longitudinal plane extends along an outer surface of said front wheel and said opening is positioned toward a center of said vehicle from said longitudinal plane.

8. The vehicle of claim 7, wherein a generally vertical transverse plane extends along a rearmost surface of said front wheel and said opening is positioned rearward of said transverse plane.

9. The vehicle of claim 1 further comprising a carrying rack that is disposed above at least a portion of the fender assembly, said carrying rack comprising an uppermost portion, a generally horizontal plane being defined through said uppermost portion and said gear shift actuator comprising an uppermost extreme, a substantial portion of said uppermost extreme being disposed lower than said horizontal plane.

10. The vehicle of claim 1, wherein said opening in said fender assembly forms an upper rim of a compartment in which a main portion of said gear shift actuator is positioned.

11. The vehicle of claim 10, wherein a drain extends through at least one wall of said compartment.

12. The vehicle of claim 1, wherein said opening forms an upper lip of a recess in which said gear shift actuator is disposed.

13. The vehicle of claim 12, wherein said gear shift actuator comprises a gear shift lever.

14. The vehicle of claim 13, wherein a knob is disposed at an upper end of said gear shift actuator and a lock button is disposed on said knob.

15. The vehicle of claim 13, wherein a dust cover extends around at least a central portion of said gear shift lever.

16. The vehicle of claim 12, wherein the at least one front wheel is suspended by a suspension system and said recess is disposed such that said at least one front wheel cannot contact said recess when said suspension system is removed and said at least one front wheel is turned.

17. The vehicle of claim 12 further comprising a footboard and said gear shift actuator being disposed forward of a forwardmost portion of said footboard.

18. An all terrain vehicle comprising a frame defining an engine compartment, at least one front wheel and at least one rear wheel supporting said frame, an engine mounted in said engine compartment, a drive train connecting said engine to at least one of said front wheel or said rear wheel, a fender assembly being disposed above at least a rear portion of said front wheel, said fender assembly having a recess formed therein, and a gear shift actuator at least partially disposed in said recess.

19. The vehicle of claim 18, wherein said gear shift actuator comprises a shift lever.

20. The vehicle of claim 19, wherein said fender assembly comprises a forward extending mid portion, a substantially vertical rear portion, and a transition portion disposed between said mid portion and said rear portion, said recess being formed in at least one of said rear portion and said transition portion of said fender assembly.

21. The vehicle of claim 20 further comprising a fuel tank being supported by said frame assembly, said fuel tank comprising a side surface and said recess being formed adjacent said side surface.

22. The vehicle of claim 19, wherein said fender assembly is formed of a synthetic resin, and said recess is formed integrally with said fender assembly.

23. The vehicle of claim 22, wherein said fender assembly is formed of a single unitary component.

24. The vehicle of claim 19, wherein a majority of said gear shift actuator is positioned below a generally horizontal plane defined along a mid portion of said fender.

25. The vehicle of claim 24 further comprising a front carrier rack disposed above at least a portion of said fender assembly, a generally horizontal plane being defined along a portion of said front carrier rack and said gear shift actuator being positioned substantially completely below said plane.

26. The vehicle of claim 19, wherein said recess is disposed forward of a forwardmost lateral surface of said engine.

27. The vehicle of claim 18, wherein said opening in said fender assembly forms an upper rim of said recess.

28. The vehicle of claim 27, wherein a drain extends through at least one wall of said recess.

29. The vehicle of claim 28, wherein said gear shift actuator comprises a gear shift lever.

30. The vehicle of claim 29, wherein a knob is disposed at an upper end of said gear shift actuator and a lock button is disposed on said knob.

31. The vehicle of claim 29, wherein a dust cover extends around at least a central portion of said gear shift lever.

32. The vehicle of claim 28, wherein the at least one front wheel is suspended by a suspension system and said recess is disposed such that said at least one front wheel cannot contact said recess when said suspension system is removed and said at least one front wheel is turned.

33. The vehicle of claim 27 further comprising a footboard and said gear shift actuator being disposed forward of a forwardmost portion of said footboard.

34. An all terrain vehicle comprising at least one suspended front wheel and at least one suspended rear wheel supporting a frame, a seat being supported by said frame, a front fender assembly extending above and wrapping downward over a rear portion of said at least one front wheel, a footboard disposed on each side of said seat, a steering assembly comprising a steering handle that is operatively connected to said at least one suspended front wheel, an engine compartment being defined within said frame and an engine being mounted in said engine compartment, a shiftable drive train connecting said engine to at least one of said at least one suspended front wheel and said at least one suspended rear wheel, a gearshift actuator being operatively connected to said drivetrain and being mounted within a substantially enclosed recess extending through and disposed below said front fender assembly, said gearshift actuator being disposed generally forward of a forwardmost portion of said footboard that is positioned closest to said gearshift actuator.

35. The vehicle of claim 34, wherein an uppermost portion of said gearshift actuator is disposed below a horizontal plane defined through a lowermost surface of said steering handle.

36. The vehicle of claim 34, further comprising a fuel tank, said fuel tank being positioned generally above said engine and said uppermost portion of said gearshift actuator being disposed vertically lower than an uppermost surface of said fuel tank.

* * * * *